(12) United States Patent
Oh et al.

(10) Patent No.: US 8,648,963 B2
(45) Date of Patent: Feb. 11, 2014

(54) EYEBALL DEVICE FOR USE IN ROBOTS

(75) Inventors: Kyung Geune Oh, Seoul (KR);
Seung-Jong Kim, Seoul (KR); Myoung Soo Jang, Seoul (KR); Chan Yul Jung, Bucheon-si (KR)

(73) Assignee: Korea Institute of Science and Technology, Seoul (KR)

( * ) Notice: Subject to any disclaimer, the term of this patent is extended or adjusted under 35 U.S.C. 154(b) by 653 days.

(21) Appl. No.: 12/767,252

(22) Filed: Apr. 26, 2010

(65) Prior Publication Data
US 2010/0271540 A1    Oct. 28, 2010

(30) Foreign Application Priority Data
Apr. 28, 2009    (KR) .................. 10-2009-0037249

(51) Int. Cl.
*H04N 5/225* (2006.01)
*G03B 17/00* (2006.01)
*H04N 7/18* (2006.01)
*H04N 5/228* (2006.01)

(52) U.S. Cl.
USPC ............ 348/375; 348/151; 348/373; 396/427

(58) Field of Classification Search
USPC ................... 348/143, 151, 373–375; 396/427
See application file for complete search history.

(56) References Cited

U.S. PATENT DOCUMENTS

| | | | | |
|---|---|---|---|---|
| 4,225,881 A | * | 9/1980 | Tovi ............................... | 348/151 |
| 6,628,338 B1 | * | 9/2003 | Elberbaum et al. ............ | 348/373 |
| 7,777,810 B2 | * | 8/2010 | Kung et al. ................... | 348/374 |
| 2002/0085844 A1 | * | 7/2002 | Tashiro et al. ................ | 396/427 |
| 2005/0018074 A1 | * | 1/2005 | Nakamoto et al. ............ | 348/375 |
| 2009/0028542 A1 | * | 1/2009 | Nakamoto et al. ............ | 396/427 |

FOREIGN PATENT DOCUMENTS

| | | |
|---|---|---|
| JP | 2006-065094 A | 3/2006 |
| KR | 10-0724792 B1 | 5/2007 |
| KR | 10-0724792 | 6/2007 |

OTHER PUBLICATIONS

Korean Intellectual Property Office, Office Action dated Apr. 8, 2011.

* cited by examiner

*Primary Examiner* — Twyler Haskins
*Assistant Examiner* — Carramah J Quiett
(74) *Attorney, Agent, or Firm* — NSIP Law (57) ABSTRACT

Various embodiments of an eyeball device for use in robots are provided. In one embodiment, the eyeball device has an eyeball, a main part having a camera, a frame having first and second sections, first and second actuators, a first connecting member and a second connecting member. The first section is horizontally pivotally coupled to the main part relative to the main part, while the second section vertically pivotally supports the eyeball. The first and second actuators produce rotary motions. The first connecting member is coupled to the first section and the first actuator to connecting the rotary motion of the first actuator to the first section. The second connecting member is coupled to the eyeball and the second actuator to transmit the rotary motion of the second actuator to the eyeball. The eyeball horizontally pivots through the first connecting member and vertically pivots through the second connecting member.

11 Claims, 7 Drawing Sheets

EYEBALL DEVICE FOR USE IN ROBOTS

CROSS-REFERENCE TO RELATED APPLICATIONS

This application claims priority from Korean Patent Application No. 10-2009-037249 filed on Apr. 28, 2009, the entire disclosure of which is incorporated herein by reference.

TECHNICAL FIELD

The present disclosure relates to an eyeball device for use in robots, wherein actuation from one actuator is not influenced by actuation from another actuator.

BACKGROUND

A multi-DOF (Degree Of Freedom) rotary mechanism may be classified into a serial type and a parallel type depending on whether or not one rotational DOF motion affects another rotational DOF motion.

The serial type multi-DOF rotary mechanism has been widely used in the art to the extent that eighty percent of industrial robots employ the serial type multi-DOF rotary mechanism. In the serial type multi-DOF rotary mechanism, each of the rotational DOFs can be individually controlled. Thus, it has a convenient control and an easy dynamical solution. Specially, a serial type multi-DOF rotary mechanism with a few DOFs can be easily designed. However, to ensure each independent rotational DOF motion with respect to multi-DOFs, actuators must move along with other rotational DOF motions. Thus, there is a problem in that a rotational inertia increases due to each independent rotary motion and a driving efficiency of a system deteriorates accordingly. Further, since a space for moving the actuators must be taken into account, it has disadvantages in terms of space utilization. Thus, increase in DOFs in the serial type multi-DOF rotary mechanism can lead to problems of complicating a structure of a system and increasing the rotational inertia of the system. Further, it is disadvantageous in that serially arranged links weaken a durability of the system and accumulated measurement errors from each link do not provide precise control of the system.

The parallel type multi-DOF rotary mechanism is configured such that each of the actuators is independently situated. Thus, it is advantageous in that links parallel coupled to each actuator enhance the durability of a system and measurement errors from each link are not accumulated. However, since one rotational DOF motion affects another rotational DOF motion, a control and a structure of the system are complicated. Further, it has technical difficulties in that a real time control for the system is impossible since no unique solution in forward kinematics and a singular point, wherein a normal control cannot be performed due to decrease in DOFs of a robot, must be considered.

Recently, to resolve the disadvantages associated with the serial and parallel types, a hybrid type multi-DOF rotary mechanism has been introduced in the art. The hybrid type multi-DOF rotary mechanism has a structure, wherein several parallel type structures are sequentially connected to one another. However, researches and developments on the hybrid type do not still reach a desirable level.

Figure 1:
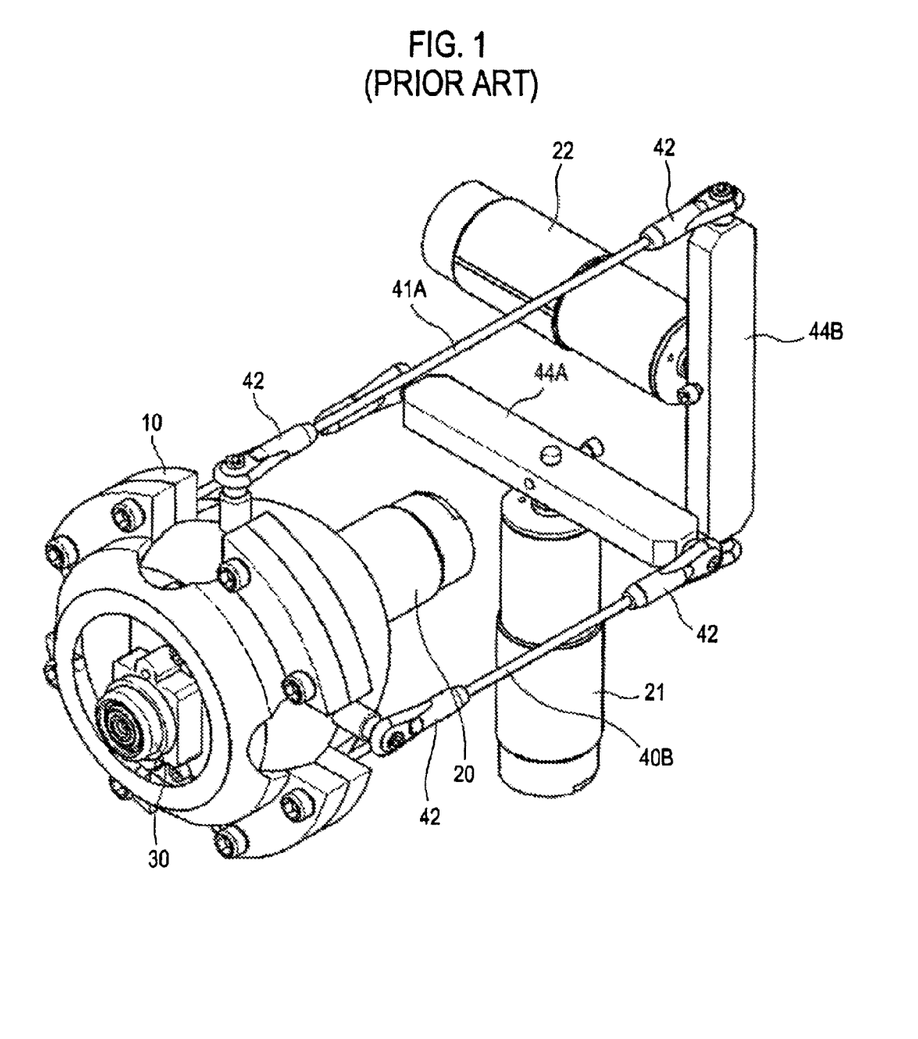
FIG. 1 is a perspective view showing a prior art robot eyeball device.
Figure 2:
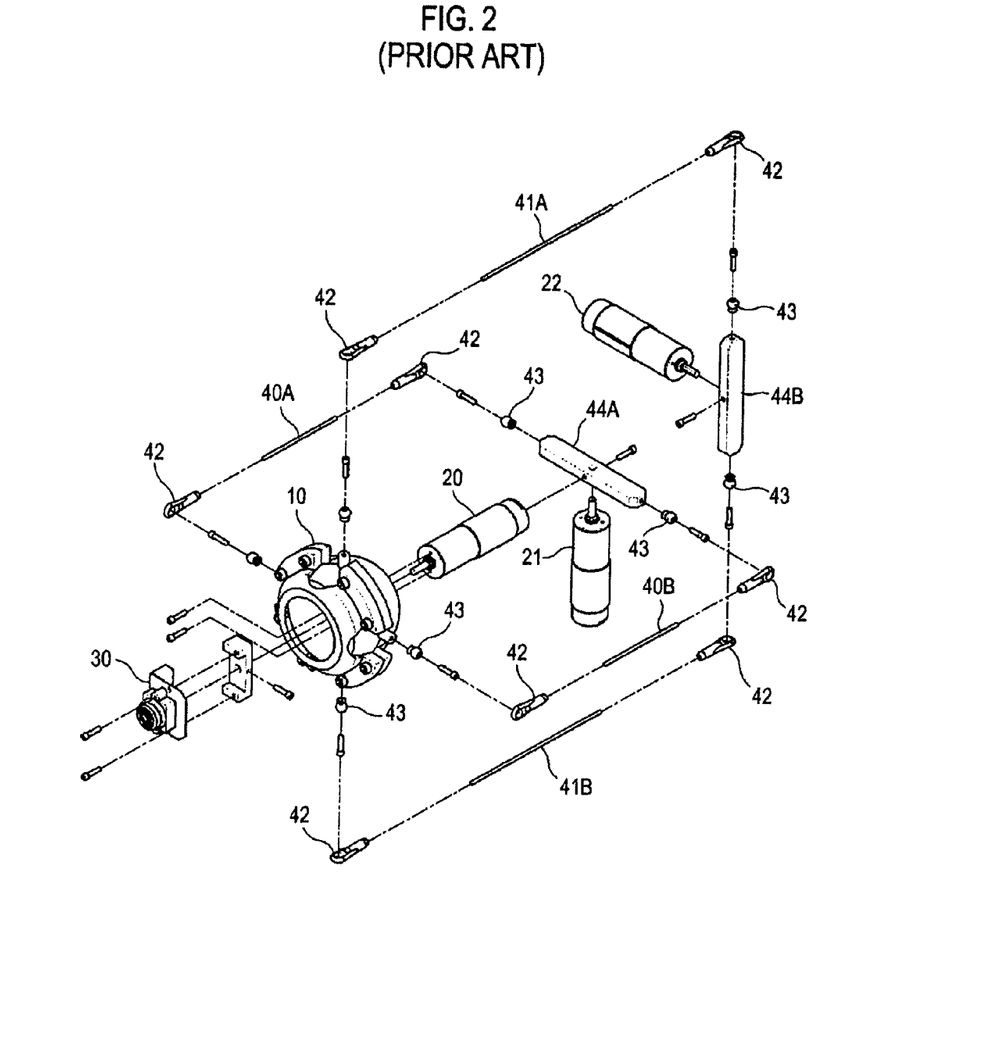
FIG. 2 is an exploded perspective view of the robot eyeball device shown in FIG. 1.

As one example of a prior art multi-DOF rotary mechanism, FIGS. 1 and 2 illustrate a robot eyeball device disclosed in Korean Patent No. 10-0724792. Referring to FIGS. 1 and 2, the robot eyeball device includes: an artificial visual part having an eyeball 10, a camera 30 and a camera support 31; a motor 20 for rolling the camera 30; motors 21, 22 for tilting and panning the eyeball 10; and a connecting part having connecting rods 40A, 40B, 41A, 41B connecting the eyeball 10 and the motors 21, 22, a ball end 42, a ball 43 and arms 44A, 44B. The eyeball 10 is actuated in a manner similar to actuation caused by a universal joint. The motors 21, 22 serve to tilt and pan the eyeball 10 by means of a combination of the connecting rods 40A, 40B, 41A, 41B, the ball end 42, the ball 43 and the arms 44A, 44B.

However, the robot eyeball device illustrated in FIGS. 1 and 2 has a problem in that the connecting rods 40A, 40B, 41A, 41B restrict the actuation range of the device and occupy a larger arrangement space to avoid any contact with the eyeball 11 and a frame member for holding the eyeball. Further, since the robot eyeball device has characteristics of a universal joint and includes the connecting rods, actuation from the motor 21 may affect actuation from the motor 22, and vice-versa. Thus, there is a problem with the robot eyeball device since the eyeball 10 involves unintended rolling motions when the eyeball 10 is horizontally panned after being tilted leftward or rightward or when the eyeball 10 is tilted upward or downward after being panned leftward or rightward. Although the eyeball 10 does not involve the rolling motions, a maximum rotatable range of the eyeball 10 may be significantly restricted when the eyeball 10 is pivoted toward one side after being pivoted toward the opposite side.

SUMMARY

Various embodiments of an eyeball device for use in robots are disclosed herein. In accordance with one embodiment of the disclosure, the eyeball device may include an eyeball, a main part having a camera, a frame having first and second sections, first and second actuators, a first connecting member and a second connecting member. The first section is horizontally pivotally coupled to the main part relative to the main part, while the second vertically pivotally supports the eyeball. The first and second actuators produce rotary motions. In this embodiment, the first connecting member may include a link member, while the second connecting member may include a wire member. The link member is coupled to the first section of the frame at one end thereof and to the first actuator at an opposite end thereof to transmit the rotary motion of the first actuator to the frame. The wire member is coupled to the eyeball at one end thereof and to the second actuator at an opposite end thereof to transmit the rotary motion of the second actuator to the eyeball. The eyeball and the frame horizontally pivot relative to the main part by the first actuator, while the eyeball vertically pivots relative to the frame and the main part by the second actuator.

In this embodiment, the device may further comprise a tubular member and a ball and socket joint that is disposed at both ends of the tubular member. The tubular member may be disposed between the eyeball and the second actuator for guiding the wire member. The ball and socket joint may be disposed at both ends of the tubular member. The wire member may pass through the ball and socket joint.

In this embodiment, the eyeball may include a first cylindrical joint and the second actuator may include an arm and a second cylindrical joint disposed at an end of the arm. The wire member may be coupled to the first cylindrical joint at the one end thereof and to the second cylindrical joint at the opposite end thereof.

In another embodiment, the first connecting member may include a wire member, while the second connecting member may include a link member.

In yet another embodiment, the first connecting member may include a first wire member, while the second connecting member may include a second wire member.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Arrangements and embodiments may be described in detail with reference to the following drawings in which like reference numerals refer to like elements and wherein.

DETAILED DESCRIPTION

A detailed description may be provided with reference to the accompanying drawings. One of ordinary skill in the art may realize that the following description is illustrative only and is not in any way limiting. Other illustrative embodiments may readily suggest themselves to such skilled persons having the benefit of this disclosure.

Figure 3:
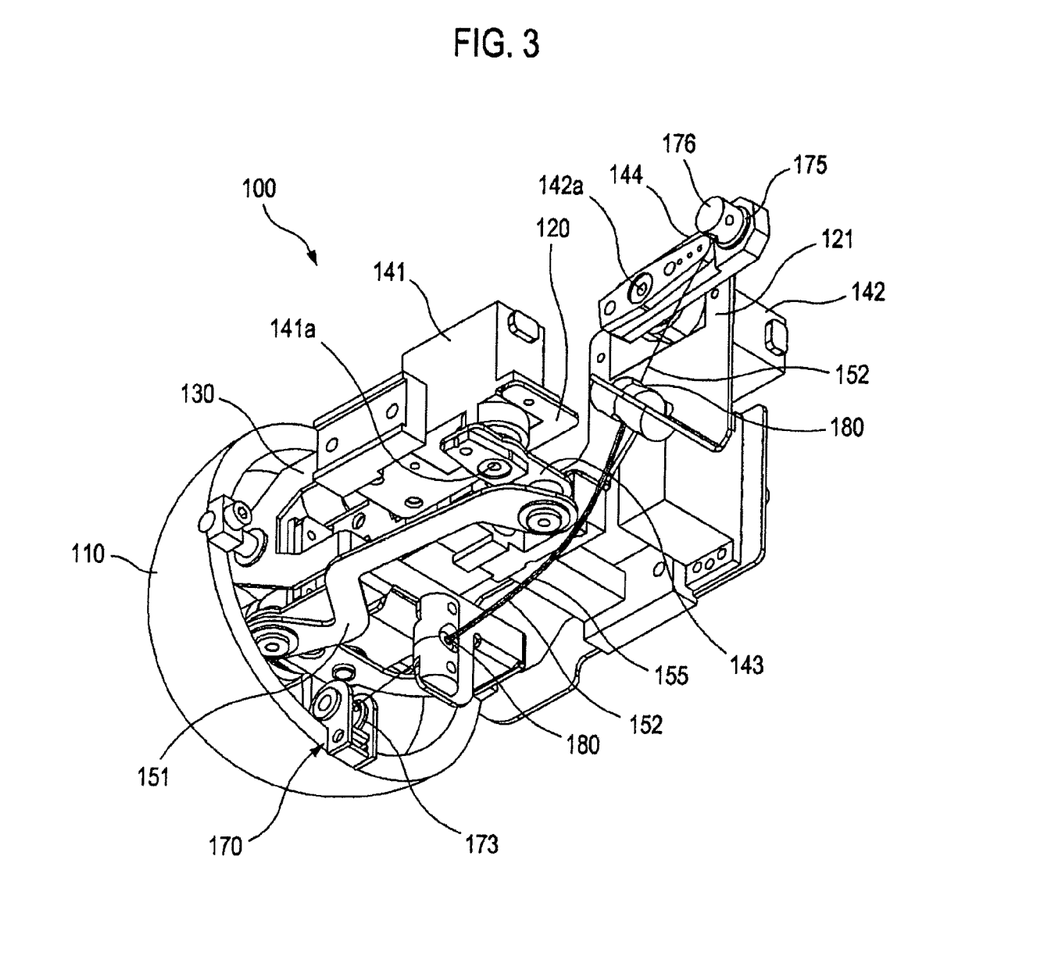
FIG. 3 is a lower perspective view showing an eyeball device for use in robots according to one embodiment of the disclosure.
Figure 4:
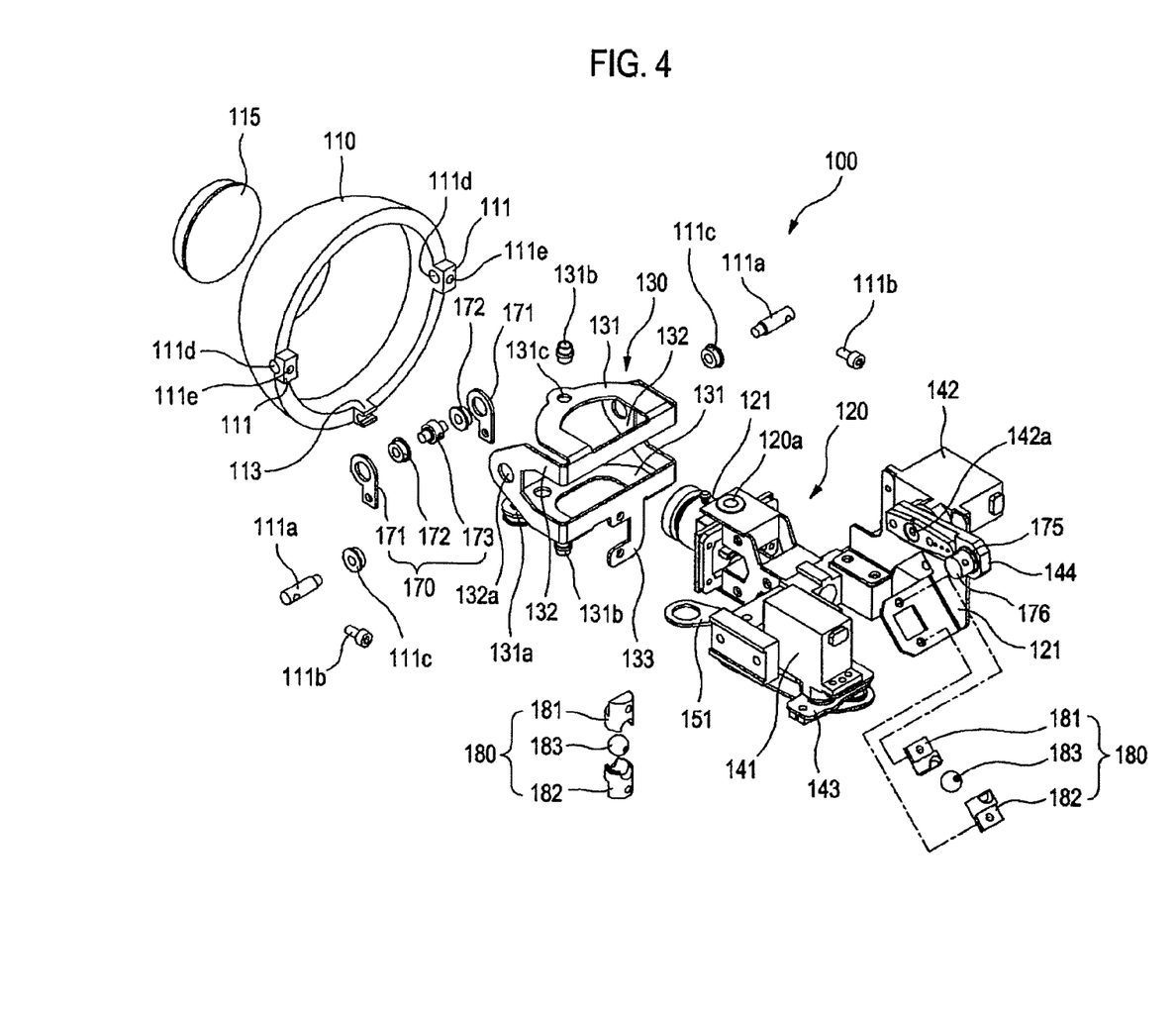
FIG. 4 is an exploded perspective view of the eyeball device shown in FIG. 3.
Figure 5:
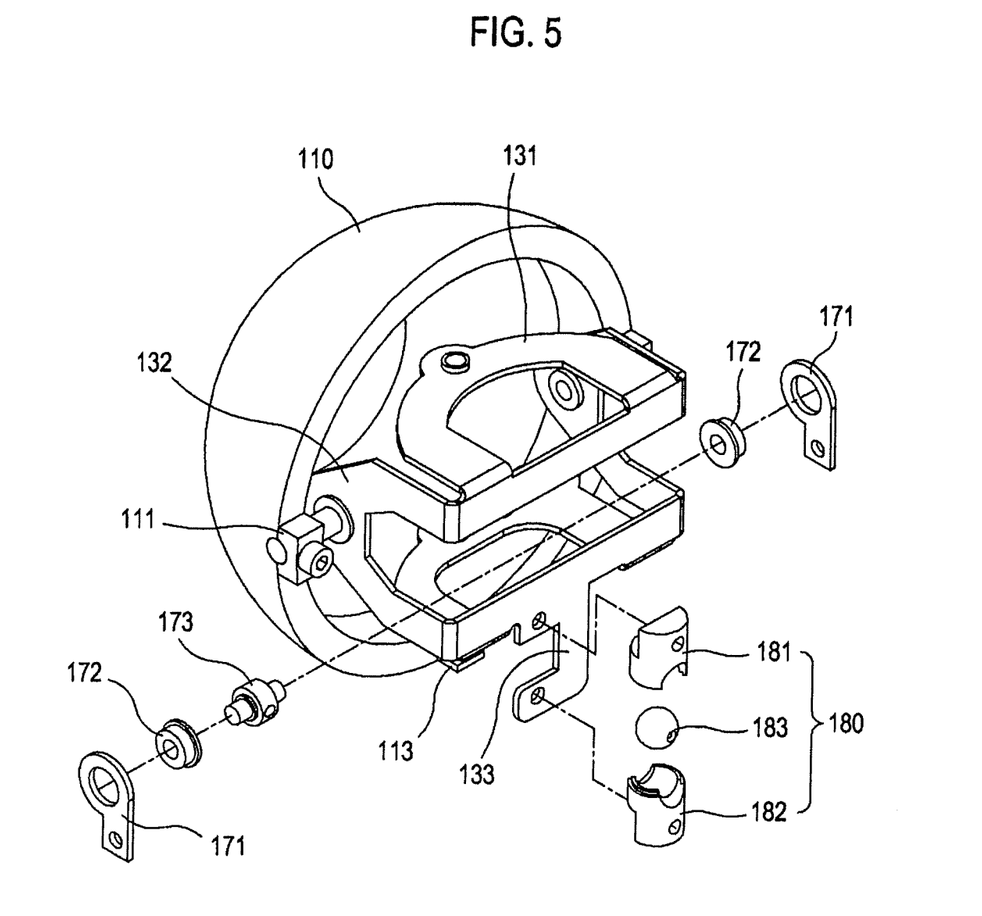
FIG. 5 is an exploded perspective view showing a frame and a ball and socket joint shown in FIG. 3.

FIG. 3 is a lower perspective view showing an eyeball device for use in robots according to one embodiment of the disclosure. FIG. 4 is an exploded perspective view showing the eyeball device shown in FIG. 3. FIG. 5 is an exploded perspective view showing a frame and a ball and socket joint shown in FIG. 3.

Referring to FIGS. 3 and 4, the eyeball device 100 may include the following: an eyeball 110; a main part 120 having a camera 121; a frame 130 having a first section 131 horizontally pivotally coupled to the main part 120 relative to the main part 120 and a second section 132 for vertically pivotally supporting the eyeball 110; first and second actuators 141, 142 disposed to the main part 120 for producing rotary motions; a first connecting member coupled to the first section 131 of the frame 130 at its one end and to the first actuator 141 at its opposite end to transmit the rotary motion of the first actuator 141 to the frame 130; and a second connecting member coupled to the eyeball 110 at its one end and to the second actuator 142 at its opposite end to transmit the rotary motion of the second actuator 142 to the eyeball 110. The eyeball 110 and the frame 130 may horizontally pivot or pan relative to the main part 120 by the rotary motion of the first actuator 141 (e.g., referring to FIG. 3, the eyeball 110 may pan leftward and rightward relative to the main part 120). Further, the eyeball 110 may pivot or tilt vertically relative to the frame 130 and the main part 120 by the rotary motion of the second actuator 142 (e.g., referring to FIG. 3, the eyeball 110 may tilt upward and downward relative to the frame 130 and the main part 120).

The eyeball 110 may have a hollow hemispherical shape. The eyeball 110 has lugs 111 bilaterally formed on its circumferential periphery. The lugs 111 are pivotally coupled to the second section 132 of the frame 130. A shaft aperture 111d, through which a supporting shaft 111a passes, is defined in the lug 111. A securing aperture 111e, to which a bolt 111b screw-engages to secure the supporting shaft 111a to the lug 111a, is defined in the lug 111. A bracket 113, to which a first cylindrical joint 170 is fixed, is formed at a lowermost side of the eyeball 110. The eyeball 110 includes a cap having a shape similar to a human pupil, thereby vividly representing how the eyeball 110 pans and tilts.

The main part 120 may be fixed or mounted to any portion of a robot (not shown). The main part 120 has the camera 121. The first and second actuators 141, 142 are mounted or coupled to the main part 120. For the frame 130 to be pivotally coupled to the main part 120, bearing holes 120a, to which shaft bearings 131b are fitted, are formed at upper and lower sides of the main part 120.

The frame 130 may be made by bending a metallic plate material. In this embodiment, the frame 130 includes the first sections 131 and the second sections 132 that are formed by such bending. The first sections 131 are coupled to the main part 120 such that the frame 130 can horizontally pivot or pan relative to the main part 120. Further, the second sections 132 support the eyeball 110 such that the eyeball 110 can vertically pivot or tilt relative to the second section 132. The first sections 131 are vertically juxtaposed parallel to each other, while the second sections 132 are horizontally juxtaposed parallel to each other. The first sections 131 are arranged perpendicularly to the second sections 132.

Shaft apertures 131c, which mate with the bearing holes 120a of the main part 120, are defined in the first section 131. The frame 130 is pivotally coupled to the main part 120 via the shaft bearings 131b. More specifically, the shaft bearing 131b is coupled to the shaft aperture 131c of the first section 131 at its one end and to the bearing hole 120a of the main part 120 at its opposite end.

Shaft apertures 132a, which mate with the shaft apertures 111d of the lugs 111, are defined in the second sections 132. The supporting shafts 111a are secured to the lugs 111 through the bolts 111b. The supporting shafts 111a are coupled to inner sides of bearings 111c. Outer sides of the bearings 111c are coupled to the shaft apertures 132a of the second sections 132 of the frame 130. Thus, the eyeball 110 is coupled to the frame 130 so as to pivot or tilt upward and downward relative to the frame 130.

The first and second actuators 141, 142 are fixed to the main part 120. The first and second actuators 141, 142 are configured to produce rotary motion. The first and second actuators 141, 142 have arms 143, 144 extending from their respective rotating shafts 141a, 142a. When the first and second actuators 141, 141 are operated, distal ends of the arms 143, 144 are allowed to pivot within a predetermined range.

The first and second connecting members may include a link member and a wire member. In the embodiment illustrated in FIGS. 3 to 7, the first connecting member includes a link member 151, while the second connecting member includes a wire member 152. In another embodiment, the first connecting member may include a wire member, while the second connecting member may include a link member. In yet another embodiment, the first connecting member may include a first wire member, while the second connecting member may include a second wire member.

The link member 151 is pivotally coupled to the lower first section 131 of the frame 130 at its one end and to the distal end of the arm 143 of the first actuator 141 at its opposite end. As the first actuator 141 operates, the opposite end of the link member 151 coupled to the arm 143 pivots, and thus, the one end of the link member 151 pivots accordingly. As such, the eyeball 110 may pivot horizontally, laterally or leftward and rightward pivot about the shaft bearing 131b relative to the main part 120 along with the pivotal movement of the one end of the link member 151.

In another embodiment wherein the first connecting member includes a wire member the second connecting member includes a link member, the wire member may be coupled to the lower first section 131 of the frame 130 at its one end and to the distal end of the arm 143 of the first actuator 141 at its opposite end.

In yet another embodiment wherein the first and second members include wire members, the first wire member may be coupled to the lower first section 131 of the frame 130 at its one end and to the distal end of the arm 143 of the first actuator 141 at its opposite end.

The wire member 152 may include a wire or push-pull cable. The wire member 152 is coupled to the eyeball 110 at its one end and to the distal end of the arm 144 of the second actuator 142 at its opposite end. As the second actuator 142 operates, the arm 144 pushes or pulls the wire member 152. As a result, the eyeball 110 may pivot or tilt vertically or upward and downward about the supporting shaft 111a relative to the frame 130. The wire member 152 may be variously situated depending on relative positions between the frame 130 and the second actuator 142. At any case, the wire member 152 may push or pull its one end.

In another embodiment, the link member may be coupled to the eyeball 110 at its one end and to the distal end of the arm 144 of the second actuator 142a at its opposite end.

In yet another embodiment, the second wire member may be coupled to the eyeball 110 at its one end and to the distal end of the arm 144 of the second actuator 142 at its opposite end.

The eyeball device 100 may further include a tubular member 155 for guiding the wire member 152 between the eyeball 110 and the second actuator 142. The wire member 152 is movable curvilinearly or linearly within the tubular member 155 along the path of the tubular member 155. The tubular member 155 may be suitably disposed in the eyeball device 100 in view of the flex or curvature extent of the wire member 152 during rolling of the eyeball 110. Ball and socket joints 180, which will be described below, are coupled to both ends of the tubular member 155. The tubular member 155 may determine the path of the wire member 152 such that the wire member 152 cannot hinder the operations of the eyeball device or other parts of a robot. Further, the tubular member 155 may serve to prevent the wire member 152 from buckling when the second actuator 142 pushes or pulls the wire member 152.

In another embodiment, the tubular member for guiding the wire ember may be disposed between the first section 131 of the frame 130 and the first actuator 141.

In yet another embodiment, the eyeball device may further include first and second tubular members. In this case, the first tubular member for guiding the first wire member may be disposed between the first section 131 of the frame 130 and the first actuator 141, while the second tubular member for guiding the second wire member may be disposed between the eyeball 110 and the second actuator 142.

Further, the eyeball device 100 may further include the ball and socket joints 180 disposed at both ends of the tubular member 155. As shown in FIGS. 4 and 5, the ball and socket joint 180 may include upper and lower holders or sockets 181, 182 and a ball 183 freely rollable between the upper holder 181 and the lower holder 182. A through-aperture is formed in the ball 183 such that the wire member 152 passes therethrough. One of the ball and socket joints 180 is coupled to a mount bracket 133 extending downward from the frame 130. The other of the ball and socket joints 180 is coupled to an angle bracket 121 of the main part 120 adjacent to the second actuator 142. The ball and socket joint 180 secures the tubular member 155 in predetermined positions. Further, the ball and socket joint 180 may serve to prevent the wire member 152 from buckling in the vicinity of the both ends of the tubular member 155 during rolling of the eyeball 110 and to minimize a curvature change of the wire member 152.

In another embodiment, the ball and socket joints, through which the wire member passes, may be rollably disposed at both ends of the tubular member. In this case, the ball and socket joints may be configured similarly to the above-mentioned ball and socket joints 180.

In yet another embodiment, the eyeball device may further include first ball and socket joints and second ball and socket joints. In this case, the first ball and socket joints, through which the first wire member passes, may be rollably disposed at both ends of the first tubular member, while the second ball and socket joints, through which the second wire member passes, may be rollably disposed at both ends of the second tubular member. In this case, the first and second ball and socket joints may be configured similarly to the above-mentioned ball and socket joints 180.

The wire member 152 is connected to a first cylindrical joint 170 provided at the eyeball 110 at its one end and to a second cylindrical joint 175 provided at the arm 144 of the second actuator 142 at its opposite end. As shown in FIGS. 4 and 5, the first cylindrical joint 170 may include: support brackets 171 coupled to the bracket 113 of the eyeball 110 via a bolt and a nut (not shown); bearings 172 coupled to the support brackets 171 at its outer periphery; and a first rotatable cylindrical body 173 rotatably coupled to inner peripheries of the bearings 172 at its both ends. As shown in FIGS. 3 and 4, the second cylindrical joint 175 is rotatably coupled to the distal end of the arm 144 of the second actuator 142. The second cylindrical joint 175 has a second rotatable cylindrical body 176. The wire member 152 is coupled to the first rotatable cylindrical body 173 at its one end and to the second rotatable cylindrical body 176 at its opposite end. Since the first and second rotatable cylindrical pivots 173, 176 are rotatable, the wire member 152 may be prevented from buckling in the vicinity of the both ends of the wire member 152 and the curvature change of the wire member 152 may be minimized.

In another embodiment, the wire member is connected to a first cylindrical joint provided at the first section 131 of the frame 130 at its one end and to a second cylindrical joint provided at the arm 143 of the first actuator 141 at its opposite end. In this case, the first and second cylindrical joints may be configured similarly to the first and second cylindrical joints 170, 175.

In yet another embodiment, the eyeball device may further include third and fourth cylindrical joints. In this case, the first wire member is connected to the first cylindrical joint provided at the first section 131 of the frame 130 at its one end and to the second cylindrical joint provided at the arm 143 of the first actuator 141 at its opposite end. The second wire member is connected to the third cylindrical joint provided at the eyeball 110 at its one end and to the fourth cylindrical joint provided at the arm 144 of the second actuator 142 at its opposite end. In this case, the first to fourth cylindrical joints may be configured similarly to the first and second cylindrical joints 170, 175.

Figure 6:
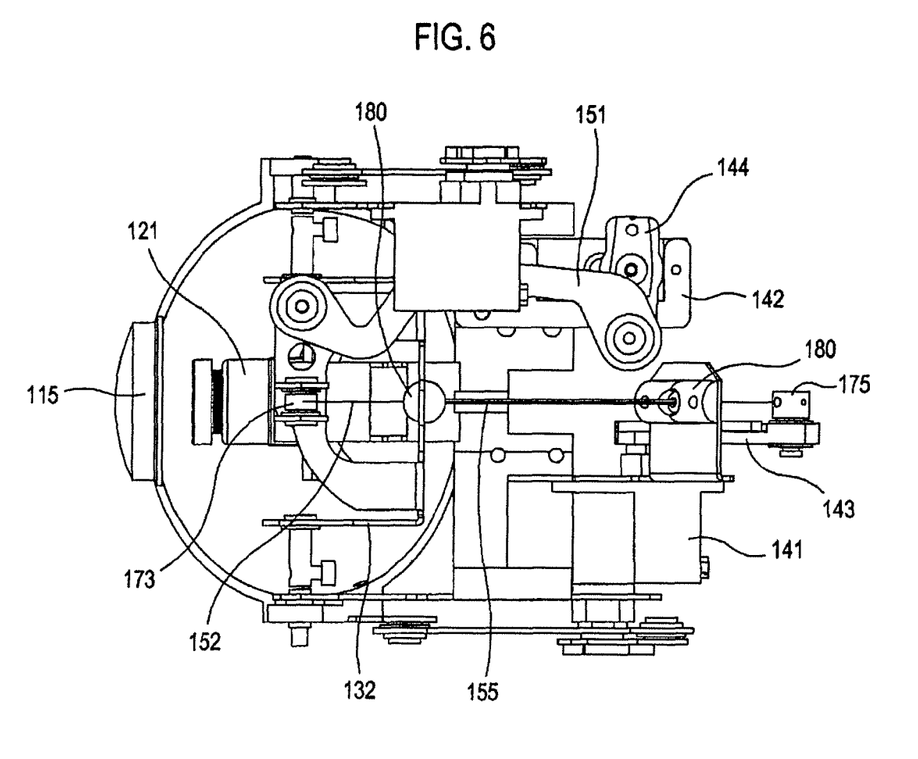
FIG. 6 is a bottom view of the eyeball device shown in FIG. 3, wherein an eyeball does not pivot.
Figure 7:
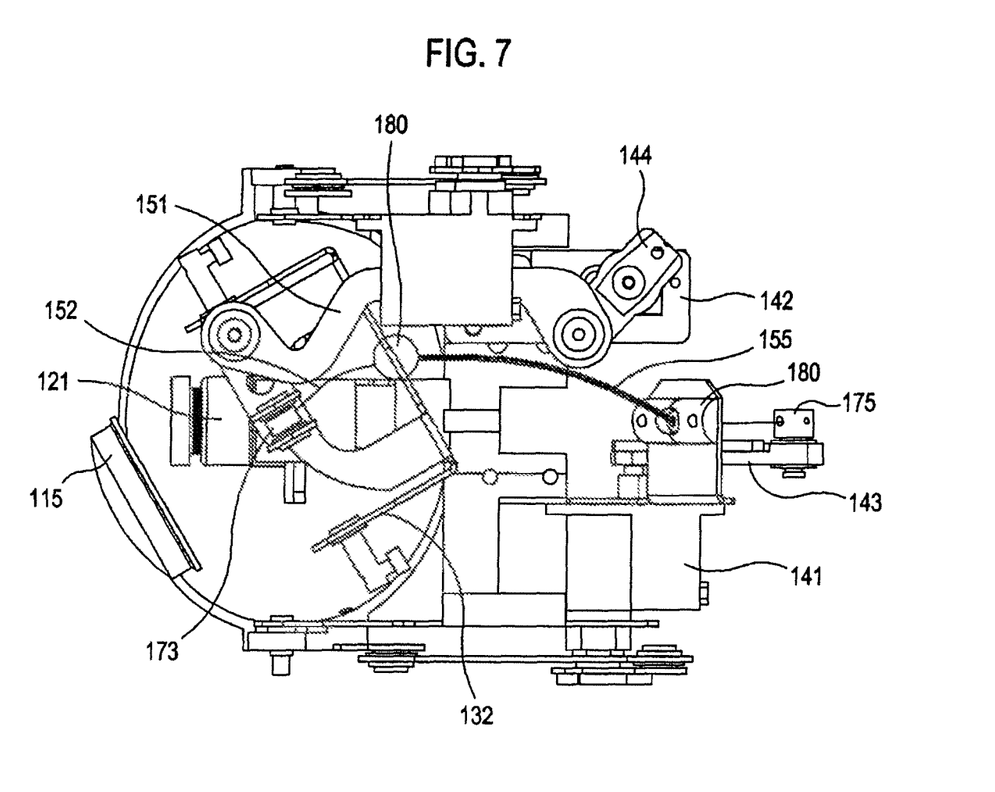
FIG. 7 is a bottom view of the eyeball device shown in FIG. 3, wherein an eyeball pivots leftward.

FIG. 6 is a bottom view of the eyeball device shown in FIG. 3, wherein the eyeball does not pivot. FIG. 7 is a bottom view of the eyeball device shown in FIG. 3, wherein the eyeball pivots leftward.

In the embodiment illustrated in FIGS. 3 to 7, the eyeball device 100 can horizontally pivot or pan the eyeball 110 coupled to the frame 130 relative to the main part 120 as the link member 151 pivots or oscillates by means of the rotary motion caused by the first actuator 141. Further, the eyeball device 100 can pivot or tilt the eyeball 110 vertically or upward and downward relative to the frame 130 as the wire member 152 pushes and pulls the eyeball 110 by means of the rotary motion caused by the second actuator 142. When the eyeball 110 does not pivot relative to the main part 120, as shown in FIG. 6, the wire member 152 and the tubular member 155 can become substantially straight. When the eyeball 110 pivots relative to the main part 120, as shown in FIG. 7, the wire member 152 and the tubular member 155 can be gently curved toward a left side.

Further, the eyeball device 100 can pivot or tilt the eyeball 110 upward and downward relative to the main part 120 by means of the second actuator 142 after or while the eyeball 110 pivots leftward or rightward. On the contrary, the eyeball device 100 can pivot the eyeball 110 leftward or rightward relative to the main part 120 by means of the first actuator 141 after or while the eyeball 110 pivots or tilts upward or downward.

According to the embodiments illustrated in FIGS. 3 to 7, the first and second actuators 141, 142 independently operate. The link member 151 connects the first actuator 141 and the frame 130. The wire member 152 connects the second actuator 142 and the eyeball 110. Thus, actuation from one of the first and second actuators does not affect actuation from the other of the first and second actuators. Accordingly, when the eyeball needs to pivot leftward or rightward from its vertically tilted position or when the eyeball needs to pivot upward or downward from its horizontally panned position, any unintended rolling motion does not occur in the eyeball 110.

Further, with the above-described constitution, rotational inertia can be reduced and durability can be enhanced when compared to a serial type rotary mechanism. Moreover, an easy control of system can be provided compared to a parallel type rotary mechanism. Furthermore, by using the wire member 152 between the second actuator 142 and the eyeball 110, when the eyeball tilts upward or downward after being pivoted leftward or rightward, a pivot range of the eyeball 110 can be extended.

In the embodiments described in present disclosure, the tubular member wraps or jackets the wire member and the ball and socket joints are disposed at both ends of the tubular member. Thus, the wire member can be situated in any position without any interference with parts of the eyeball device. Further, it is possible to prevent the wire member from buckling and to minimize the curvature change of the wire member in the vicinity of the both ends of the tubular member. Also, in the embodiments described in present disclosure, both ends of the wire member are joined to the eyeball and the arm of the second actuator through the rotatable cylindrical bodies of the cylindrical joints. Thus, it is possible to prevent the wire member from buckling and to minimize the curvature change of the wire member in the vicinity of the eyeball and the arm.

Although embodiments have been described with reference to a number of illustrative embodiments thereof, it should be understood that various other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An eyeball device, comprising:
   an eyeball;
   a main part having a camera;
   a frame having a first section and a second section, the first section being horizontally pivotally coupled to the main part relative to the main part, the second section vertically pivotally supporting the eyeball;
   first and second actuators mounted to the main part for producing rotary motions;
   a first connecting member coupled to the first section of the frame at one end thereof and to the first actuator at an opposite end thereof to transmit the rotary motion of the first actuator to the frame; and
   a second connecting member coupled to the eyeball at one end thereof and to the second actuator at an opposite end thereof to transmit the rotary motion of the second actuator to the eyeball, wherein
   the eyeball and the frame horizontally pivot relative to the main part by the first actuator and the eyeball vertically pivots relative to the frame and the main part by the second actuator,
   wherein the first connecting member comprises a link member and the second connecting member comprises a wire member,
   wherein the eyeball device further comprises
      a tubular member disposed between the eyeball and the second actuator configured to guide the wire member, and
      a ball and socket joint disposed at both ends of the tubular member, and
      wherein the wire member passes through the ball and socket joint.

2. The eyeball device of claim 1, wherein the eyeball includes a first cylindrical joint and the second actuator includes an arm and a second cylindrical joint disposed at an end of the arm, and wherein the wire member is coupled to the first cylindrical joint at the one end thereof and to the second cylindrical joint at the opposite end thereof.

3. The eyeball device of claim 1, wherein the first connecting member includes a wire member and the second connecting member includes a link member.

4. The eyeball device of claim 3, further comprising a tubular member disposed between the first section of the frame and the first actuator for guiding the wire member.

5. The eyeball device of claim 4, further comprising a ball and socket joint disposed at both ends of the tubular member, and wherein the wire member passes through the ball and socket joint.

6. The eyeball device of claim 3, wherein the first section of the frame includes a first cylindrical joint and the first actuator includes an arm and a second cylindrical joint disposed at an end of the arm, and wherein the wire member is coupled to the first cylindrical joint at the one end thereof and to the second cylindrical joint at the opposite end thereof.

7. The eyeball device of claim 1, wherein the first connecting member includes a first wire member and the second connecting member includes a second wire member.

8. The eyeball device of claim 7, further comprising a first tubular member disposed between the first section of the frame and the first actuator for guiding the first wire member; and a second tubular member disposed between the eyeball and the second actuator for guiding the second wire member.

9. The eyeball device of claim 8, further comprising first and second ball and socket joints disposed at both ends of the first and second tubular members, respectively, and wherein the first and second wire members pass through the first and second ball and socket joints, respectively.

10. The eyeball device of claim 7, wherein the first section of the frame includes a first cylindrical joint and the first actuator includes a first arm and a second cylindrical joint disposed at an end of the first arm, and wherein the first wire member is coupled to the first cylindrical joint at the one end thereof and to the second cylindrical joint at the opposite end thereof.

11. The eyeball device of claim 7, wherein the eyeball includes a third cylindrical joint and the second actuator includes a second arm and a fourth cylindrical joint disposed at an end of the second arm, and wherein the second wire member is coupled to the third cylindrical joint at the one end thereof and to the fourth cylindrical joint at the opposite end thereof.

* * * * *